United States Patent [19]

Maji et al.

[11] Patent Number: 4,844,220
[45] Date of Patent: Jul. 4, 1989

[54] TORQUE LIMITER

[75] Inventors: Hiroshi Maji; Sukehachi Oi, both of Mie, Japan

[73] Assignee: Shinko Electric Co., Ltd., Japan

[21] Appl. No.: 18,572

[22] Filed: Feb. 25, 1987

[30] Foreign Application Priority Data

Feb. 26, 1986 [JP] Japan .............................. 61-027199[U]
May 19, 1986 [JP] Japan .............................. 61-075166[U]
May 19, 1986 [JP] Japan .............................. 61-075167[U]

[51] Int. Cl.$^4$ .............................................. F16F 15/03
[52] U.S. Cl. ........................................ 188/267; 188/268; 188/164; 192/84 PM
[58] Field of Search ........................ 188/267, 268, 164; 192/21.5, 53 D, 84 PM

[56] References Cited

U.S. PATENT DOCUMENTS

| | | | |
|---|---|---|---|
| 2,612,248 | 9/1952 | Feiertag | 192/21.5 |
| 2,642,740 | 7/1953 | Stephenson et al. | 192/21.5 |
| 2,650,684 | 9/1953 | English et al. | 192/21.5 |
| 2,654,454 | 10/1953 | Turkish | 192/21.5 |
| 2,656,026 | 10/1953 | Feiertag | 192/21.5 |
| 2,897,931 | 8/1959 | Didszuns | 192/21.5 |
| 4,239,092 | 12/1980 | Janson | 188/267 |

FOREIGN PATENT DOCUMENTS

| | | | |
|---|---|---|---|
| 525316 | 5/1956 | Canada | 192/84 PM |
| 847395 | 9/1960 | United Kingdom | 192/84 PM |

Primary Examiner—Andres Kashnikow
Assistant Examiner—Mark T. Le
Attorney, Agent, or Firm—Wenderoth, Lind & Ponack

[57] ABSTRACT

A torque limiter comprises: a bottomed cylinder formed of a magnetic material; an end plate fixedly and coaxially fitted in the open end of the cylinder; a rotary shaft coaxially and rotatably supported in bearings fitted in the bottom wall of the cylinder and the end plate, respectively; two rotors formed of a magnetic material and coaxially secured to the rotary shaft; a permanent magnet disposed between and contiguously to the rotors and coaxially secured to the rotary shaft; and an annular core formed of a magnetic material and coaxially fitted in the cylinder contiguously to the end plate; magnetic powder filled an axially in extending gap between the core and one of the rotors disposed opposite to the core; and sealing members disposed between the bottom wall of the cylinder and one of the rotors on the side of the bottom. surface of the cylinder and between the inner end wall of the end plate and the other rotor on the side of the end plate. In filling the magnetic powder in the gap, the cylinder is placed upright with the open end thereof turned up, then the magnetic powder is distributed over a radially outermost part of an axial end surface of the rotor, and then the annular core and the end plate are fitted in the open end of the cylinder in that order. Since the rotor is magnetized by the permanent magnet, the magnetic powder is attracted to the rotor, and hence will not fall off, which facilitates filling the magnetic powder in the gap.

8 Claims, 3 Drawing Sheets

TORQUE LIMITER

BACKGROUND OF THE INVENTION

1. Field of the Invention

The present invention relates to a torque limiter including a magnetic powder clutch which yields to a torque exceeding a specific magnitude, for use in the transmission line of general industrial machines, such as copying machines and wire winding machines, for limiting the torque acting on the transmission line to a specific magnitude.

2. Description of the Prior Art

The construction and functions of a conventional torque limiter for such a purpose will be described with reference to FIG. 7 showing the upper half of the torque limiter in a longitudinal section.

Shown in FIG. 7 are a rotary shaft 1, bearings 2, a cylinder 3 made of a magnetic material, end plates 4 and 5 made of a nonmagnetic material such as brass or a stainless steel and fixedly fitted in the opposite ends of the cylinder 3, respectively, rotors 6 and 7 made of a magnetic material and coaxially secured to the rotary shaft 1, a permanent magnet 8 disposed between the rotors 6 and 7, and coaxially secured to the rotary shaft 1, magnetic powder P such as iron powder filled in a space A within the cylinder 3, and sealing members 9 such as oil seal elements or felt rings for preventing the entrance of the magnetic powder P into the bearings 2. The rotary shaft 1 is supported rotatably in the bearings 2 on the end plates 4 and 5.

The rotor 6, the magnetic powder P, the cylinder 3, the magnetic powder P and the rotor 7 form a magnetic circuit $\phi$ indicated by a broken line followed by the magnetic flux of the permanent magnet 8. The torque of the rotary shaft 1 is transmitted to the cylinder 3 or the torque of the cylinder 3 is transmitted to the rotary shaft 1 by the agency of the magnetic flux. When the torque to be transmitted exceeds a specific magnitude, the magnetic flux is unable to transmit the torque and allows the rotary shaft 1 and the cylinder 3 to move relative to each other, so that the torque capable of being transmitted by the torque limiter is limited to a valve which is below the specific magnitude.

The conventional torque limiter has the following drawbacks:

(1) In filling the magnetic powder P in the cylinder 3, the magnetic powder P is liable to stagnate in a space B between the outer end surface of the rotor 7 and the inner end surface of the end plate 5 and between the outer end surface of the rotor 6 and the inner end surface of the end plate 4, and hence it is difficult to fill the magnetic powder P satisfactorily in the normal space A between the outer circumferences of the rotors 6 and 7, and the inner circumference of the cylinder 3.

(2) The magnetic powder P is liable to stay in the space B while the torque limiter is stopped and starts gradually migrating to the normal space A after the torque limiter has started rotating, and hence the torque limiter is unable to transmit torque satisfactorily in the initial period of operation.

SUMMARY OF THE INVENTION

Accordingly, an object of the present invention is to provide a torque limiter of a construction allowing which easily allows filling of the magnetic powder in an effective space therein.

Another object of the present invention is to provide a torque limiter capable of stably transmitting torque from the beginning of operation.

A further object of the present invention is to provide a torque limiter capable of effective torque transmission.

Still a further object of the present invention is to provide a torque limiter capable of varying in torque transmission capacity.

According to one aspect of the present invention, a torque limiter comprises a rotary shaft, a cylinder coaxially and rotatably receiving the rotary shaft therethrough, rotors coaxially secured to the rotary shaft, a permanent magnet disposed between the rotors and coaxially secured to the rotary shaft, an end plate fixedly fitted in one end of the cylinder, a magnetic core secured to the end plate, and magnetic powder filled in a space between the outer end surface of one of the rotors and the inner surface of the end plate.

According to another aspect of the present invention, a torque limiter comprises a rotary shaft, a cylinder coaxially and rotatably receiving the rotary shaft therethrough, a rotor coaxially secured to the rotary shaft, a permanent magnet secured to the inner end surface of the cylinder, a magnetic core attached to the surface facing the rotor of the permanent magnet, and magnetic powder filled in a space between the opposite end surfaces of the magnetic core and the rotor.

According to a further aspect of the present invention, a torque limiter comprises a rotary shaft, a rotor coaxially secured to the rotary shaft, a cylinder coaxially and rotatably receiving the rotary shaft therethrough, end plates fixedly fitted in the opposite ends of the cylinder, respectively, permanent magnets attached to the respective inner end surfaces of the end plates, respectively, magnetic cores attached to the respective inner end surfaces of the permanent magnets, respectively, and magnetic powder filled in a space between one end surface of the rotor and the inner end surface of one of the magnetic cores and in a space between the other end surface of the rotor and the inner end surface of the other magnetic core.

According to still a further aspect of the present invention, a torque limiter comprises a rotary shaft, a cylinder coaxially and rotatably receiving the rotary shaft therethrough, rotors coaxially secured to the rotary shaft, a permanent magnet disposed between the rotors and coaxially secured to the rotary shaft, an end plate fixedly fitted in one end of the cylinder, a magnetic core attached to the inner end surface of the end plate, a gap adjusting plate disposed between one of the rotor near the bottom of the cylinder and the bottom surface of the cylinder, and magnetic powder filled in a space between the outer end surface of the other rotor and the inner end surface of the magnetic core.

The above and other objects, features and advantages of the present invention will become more apparent from the following description when taken in conjunction with the accompanying drawings.

BRIEF DESCRIPTION OF THE DRAWINGS

In the drawings, like reference characters designate like or corresponding parts throughout.

DESCRIPTION OF THE PREFERRED EMBODIMENTS

Figure 1:
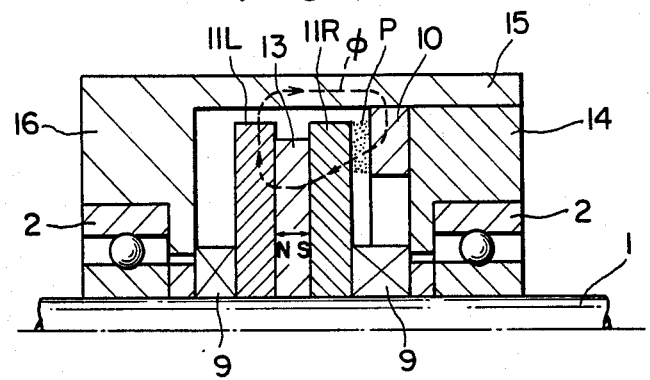
FIG. 1 is a longitudinal sectional view showing the upper half of a torque limiter, in a first embodiment, according to the present invention.

First Embodiment (FIG. 1)

Referring to FIG. 1, there are shown a rotary shaft 1, bearings 2, sealing members 9, a cup-shaped magnetic cylinder 15 having a radially extending bottom wall 16 and an annular wall extending axially from the bottom wall, the cylinder being formed of a magnetic material, radially extending magnetic rotors 11R and 11L formed of a magnetic material and coaxially secured to the axially extending rotary shaft 1, a radially extending permanent magnet 13 disposed between the rotors 11R and 11L and coaxially secured to the rotary shaft 1, an end plate 14 closing the open end of the cylinder 15 and formed of a nonmagnetic material, such as brass or stainless steel, or a magnetic material, such as steel, a radially extending magnetic core 10 attached to an axial inner end surface of the end plate 14, and magnetic powder P filled in an axially extending gap between the radially outermost axial end surface of the rotor 11R and the radially outermost axial inner end surface of the magnetic core 10. The rotary shaft 1 is supported rotatably in the bearings 2 fitted in the end plate 14 and the bottom wall 16 of the cylinder 15, respectively. The sealing members 9 prevent the entrance of the magnetic powder P into the bearings 2.

In this torque limiter, a magnetic flux circuit $\phi$ is formed from the permanent magnet 13 via the rotor 11L, the cylinder 15, the magnetic core 10, the magnetic powder P and the rotor 11R to the permanent magnet 13 as indicated by a broken line. Torque is transmitted from the rotary shaft 1 to the cylinder 15 or from the cylinder 15 to the rotary shaft 1 by the agency of magnetic flux following the magnetic circuit $\phi$. When the torque exceeds a specific magnitude, the rotary shaft 1 and the cylinder 15 slip circumferentially relative to each other to limit the torque to be transmitted.

In filling the magnetic powder P in the torque limiter, the cylinder is placed upright with the open end thereof turned up, then the magnetic powder P is distributed over the outer end surface, namely, the upper axial end surface in this situation, of the rotor 11R through the open end of the cylinder, and then the end plate 14 is fitted in the open end of the cylinder 15. Since the rotor 11R is magnetized by the permanent magnet 13, the magnetic powder P stays over the outer axial end surface of the rotor 11R, which facilitates filling the magnetic powder P in the torque limiter. Since the magnetic powder P is attracted to the rotor 11R and always stays in place, the torque limiter is able to function normally and stably from the beginning of operation without delay.

Figure 2:
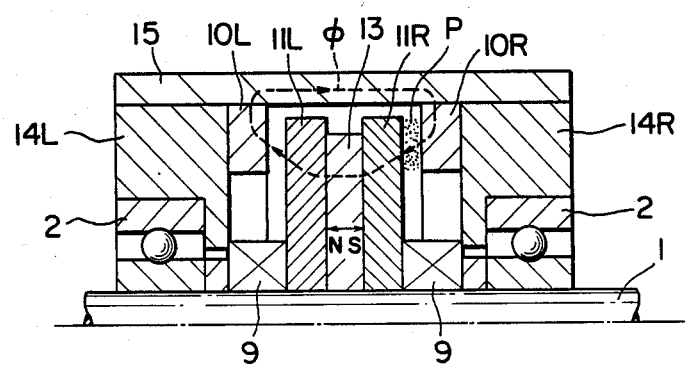
FIG. 2 is a longitudinal sectional view showing the upper half of a torque limiter, in a second embodiment, according to the present invention.

Second Embodiment (FIG. 2)

Referring to FIG. 2, the members 1, 2, 9, 10R, 11R, 11L, 13 and 14R of the second embodiment are identical in disposition, material and construction to the members 1, 2, 9, 10, 11R, 11L, 13 and 14 of the first embodiment, respectively. The second embodiment, however, employs a cylinder 15 which is open at both opposite axial ends. An end plate 14R is fixedly fitted in one open end of the cylinder 15, while another end plate 14L is fixedly fitted in the other open end of the cylinder 15. Another magnetic core 10L is attached to a radially outermost part of the inner axial end surface of the end plate 14L. Magnetic powder P is filled in the gap between the outer axial end surface of the rotor 11R and the inner axial end surface of the magnetic core 10R. A magnetic circuit $\phi$ is formed from the permanent magnet 13, the rotor 11L, the magnetic core 10L, the cylinder 15, the magnetic core 10R, the magnetic powder P and the rotor 11R to the permanent magnet 13 as indicated by a broken line in FIG. 2. Torque is transmitted from the rotary shaft 1 to the cylinder 15 or from the cylinder 15 to the rotary shaft 1 by the agency of magnetic flux following the magnetic circuit $\phi$. When the torque exceeds a specific magnitude, the rotary shaft 1 and the cylinder 15 slip circumferentially relative to each other to limit the torque to be transmitted.

The second embodiment is the same as the first embodiment in facility of assembling, functions and effects.

Figure 3:
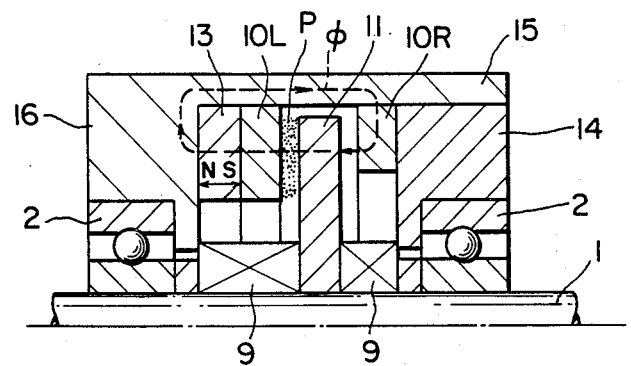
FIG. 3 is a longitudinal sectional view showing the upper half of a torque limiter, in a third embodiment, according to the present invention.

Third Embodiment (FIG. 3)

The members 1, 2, 9, 10R, 14 and 15 of the third embodiment are the same as the members 1, 2, 9, 10, 14 and 15 of the first embodiment, respectively. The third embodiment has only one rotor 11 coaxially secured to the rotary shaft 1, and an additional magnetic core 10L. The first and second embodiments each employ the disk-shaped permanent magnet 13, while the third embodiment employs an annular permanent magnet 13 which has a radially innermost surface spaced from the rotary shaft 1. The annular permanent magnet 13 is fitted in the cylinder 15 and attached to the axial inner surface of the bottom wall 16 of the cylinder 15, and the additional magnetic core 10L is attached to the axial inner end surface of the annular permanent magnet 13. The direction of magnetization of the permanent magnet 13 is parallel to the axis of the rotary shaft 1. Magnetic powder P is filled in the gap between the rotor 11 and the magnetic core 10L. Thus, a magnetic circuit $\phi$ is formed from the permanent magnet 13 through the cylinder 15, the magnetic core 10R, the rotor 11, the magnetic powder P and the magnetic core 10L to the permanent magnet 13 as indicated by a broken line in FIG. 3. Torque is transmitted from the rotary shaft 1 to the cylinder 15 or from the cylinder 15 to the rotary shaft 1 by the agency of the magnetic flux following the magnetic circuit $\phi$. When the torque exceeds a specific magnitude, the rotary shaft 1 and the cylinder 15 slip circumferentially relative to each other to limit the torque to be transmitted. In filling the magnetic powder P in the torque limiter, the cylinder is placed upright with the open end, i.e., the right-hand end as viewed in FIG. 3, turned up, and then the magnetic powder P is distributed over the axial inner end surface of the magnetic core 10L. Since the magnetic core 10L is magnetized by the permanent magnet 13, the magnetic powder P stays over the axial inner surface of the magnetic core 10L, which facilitates filing oft the magnetic powder P.

After the magnetic powder P has been distributed over the axial inner surface of the magnetic core 10L, the rotor 11 is fixedly mounted on the rotary shaft 1, and then the assembly of the magnetic core 10R and the end plate 14 is fitted in the open end of the cylinder 15. The magnetic powder P can be easily poured over the axial inner end surface of the magnetic core 10L through the open end of the cylinder 15.

Since the magnetic powder P is attracted to the magnetic core 10L and always stays in place, the torque limiter is able to function stably and normally from the beginning of operation without delay.

Figure 4:
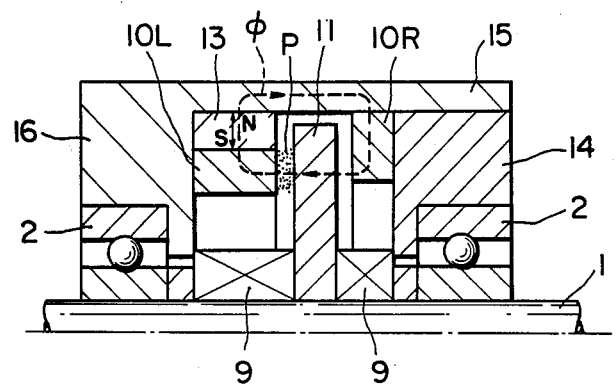
FIG. 4 is a longitudinal sectional view showing the upper half of a torque limiter, in a fourth embodiment, according to the present invention.

Fourth Embodiment (FIG. 4)

The fourth embodiment is substantially the same as the third embodiment in construction and assembling procedure. The fourth embodiment is different from the third embodiment in that an annular permanent magnet 13 is fitted in the cylinder 15, held between the inner circumference of the cylinder 15 and an annular magnetic core 10L which is disposed radially inwardly thereof, and is radially magnetized. Magnetic powder P is filled in the gap between the rotor 11 and the magnetic core 10L. A magnetic circuit $\phi$ is formed from the permanent magnet 13 through the cylinder 15, the magnetic core 10R, the rotor 11, the magnetic powder P and the magnetic core 10L to the permanent magnet 13 as indicated by a broken line in FIG. 4. Torque is transmitted from the rotary shaft 1 to the cylinder 15 or from the cylinder 15 to the rotary shaft 1 by the agency of the magnetic flux following the magnetic circuit $\phi$. When the torque exceeds a specific magnitude, the rotary shaft 1 and the cylinder 15 slip circumferentially relative to each other to limit the torque to be transmitted.

In filling the magnetic powder P in the gap between the rotor 11 and the magnetic core 10L, the cylinder is placed upright with the open end thereof turned up, and then the magnetic powder P is distributed over the axial inner end surface of the magnetic core 10L. Since the magnetic core 10L is magnetized by the permanent magnet 13, the magnetic powder P is attracted to and stays over the inner end surface of the magnetic core 10L without falling from the end surface of the magnetic core 10L, which facilitates filling the magnetic powder P. After filling the magnetic powder P, the torque limiter is assembled in the same assembling procedure as that of the third embodiment. The fourth embodiment is the same as the third embodiment in the facility of assembling, functions and effects.

Figure 5:
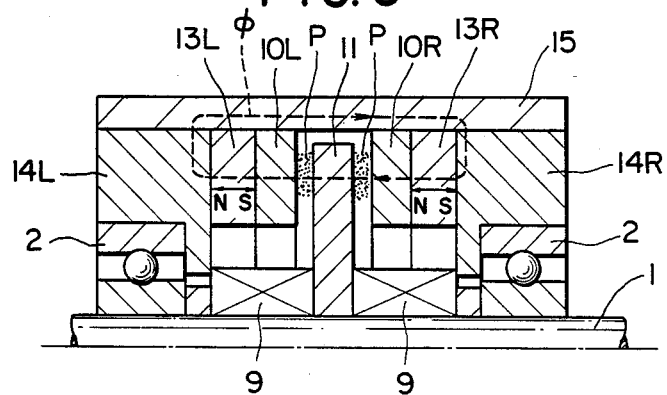
FIG. 5 is a longitudinal sectional view showing the upper half of a torque limiter, in a fifth embodiment, according to the present invention.

Fifth Embodiment (FIG. 5)

The fifth embodiment is similar to the foregoing embodiments, except that the torque transmission capacity of the fifth embodiment is greater than those of the foregoing embodiments. The fifth embodiment employs two permanent magnets to enhance the magnetic flux following the magnetic circuit $\phi$.

Referring to FIG. 5, there are shown a rotary shaft 1, bearings 2, a hollow cylinder 15 coaxially receiving the rotary shaft 1 therethrough, end plates 14R and 14L fitted in the opposite open ends of the cylinder 15, respectively, and rotatably supporting the rotary shaft 1 in the bearings 2, a rotor 11 coaxially secured to the rotary shaft 1, sealing members 9, annular permanent magnets 13R and 13L coaxially attached to the respective axial inner end surfaces of the end plates 14R and 14L, respectively, annular magnetic cores 10R and 10L coaxially attached to the respective axial inner end surfaces of the permanent magnets 13R and 13L, respectively, and magnetic powder P filled in gaps between one axial end surface of the rotor 11 and the axial inner end surface of the magnetic core 10R and between the other axial end surface of the rotor 11 and the axial inner end surface of the magnetic core 10L.

The permanent magnets 13R and 13L are disposed so that the respective directions of magnetization are the same and are parallel to the axis of the rotary shaft 1. Thus, a magnetic circuit $\phi$ is formed from the permanent magnet 13R through the magnetic core 10R, the magnetic powder P, the rotor 11, the magnetic powder P, the magnetic core 10L, the permanent magnet 13L, the end plate 14L, the cylinder 15 and the end plate 14R to the permanent magnet 13R as indicated by a broken line in FIG. 5. Torque is transmitted from the rotary shaft 1 to the cylinder 15 or from the cylinder 15 to the rotary shaft 1 by the agency of the magnetic flux following the magnetic circuit $\phi$. When the torque exceeds a specific magnitude, the rotary shaft 1 and the cylinder 15 slip circumferentially relative to each other to limit the torque to be transmitted. The enhanced magnetic flux produced by the two permanent magnets 13R and 13L enhances the torque transmission capacity of the torque limiter.

Figure 6:
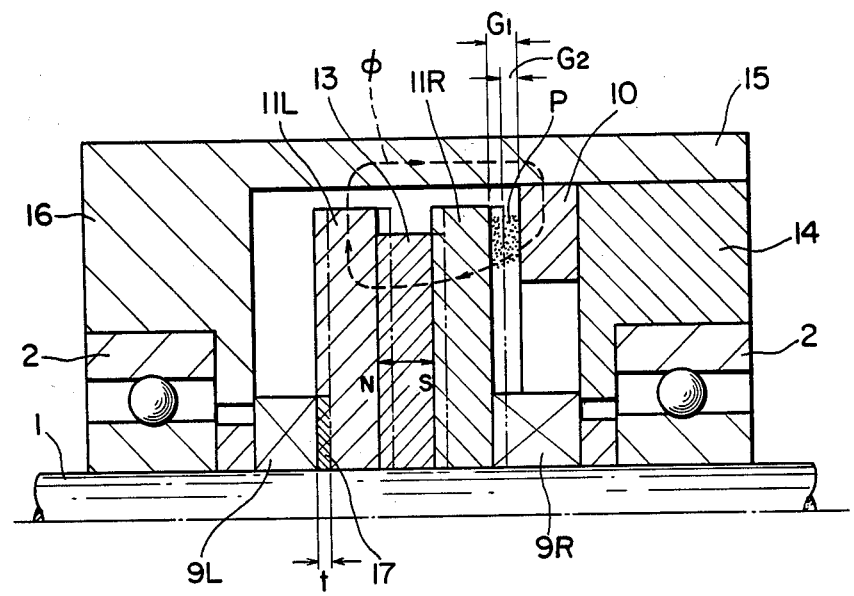
FIG. 6 is a longitudinal sectional view showing the upper half of a torque limiter, in a sixth embodiment, according to the present invention.
Figure 7:
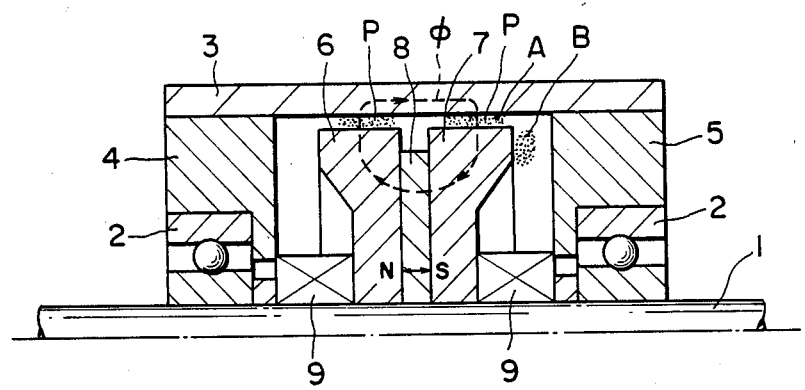
FIG. 7 is a longitudinal sectional view showing the upper half of a conventional torque limiter.

Six Embodiment (FIG. 6)

The torque transmitting capacity of a torque limiter is dependent on the type of the permanent magnetic, and the type and amount of the magnetic powder. However, in some cases, the torque transmission capacity of the torque limiter needs to be adjusted minutely. The sixth embodiment is constructed so that the adjustment of the torque transmission capacity is possible.

Referring to FIG. 6, there are shown a rotary shaft 1, bearings 2, sealing members 9R and 9L, cup-shaped cylinder 15 formed of a magnetic material and coaxially receiving the rotary shaft 1 therethrough, an annular magnetic core 10 formed of a magnetic material and fitted against a radially inner surface the cylinder 15, rotors 11R and 11L formed of a magnetic material and coaxially secured to the rotary shaft 1, a permanent magnet 13 disposed between the rotors 11R and 11L and coaxially secured to the rotary shaft 1, an end plate 14 formed of a nonmagnetic material, such as brass or a stainless steel, or a magnetic material, such as steel, and firmly fitted in the open end of the cylinder 15 so as to be contiguous to the magnetic core 10, a spacer 17 interposed between the sealing member 9L adjacent the axial inner end of the bottom wall 16 of the cylinder 15 and the rotor 11L facing the axial inner end of the bottom wall 16 of the cylinder 15, and magnetic powder P filled in the gap between the axial inner end surface of the magnetic core 10 and the radially outermost axial end surface of the rotor 11R facing the open end of the cylinder 15.

The rotary shaft 1 is supported rotatably in the bearings 2 on the bottom wall 16 of the cylinder and the end plate 14 fixedly fitted in the open end of the cylinder 15. The sealing members 9R and 9L prevent the entrance of the magnetic powder P into the bearings 2. The direction of the magnetization of the permanent magnetic is parallel to the axis of the rotary shaft 1.

A magnetic circuit $\phi$ is formed from the permanent magnet 13 the rotor 11L, through the cylinder 15, the magnetic core 10, the magnetic powder P, and the rotor 11R to the permanent magnet 13. Torque is transmitted from the rotary shaft 1 to the cylinder 15 or from the cylinder 15 to the rotary shaft 1 by the agency of the magnetic flux following the magnetic circuit $\phi$. When the torque exceeds a specific magnitude, the rotary shaft 1 and the cylinder 15 slip circumferentially relative to each other to limit the torque to be transmitted.

The size of the gap between the axial inner end surface of the magnetic core 10 and the radially outermost axial outer end surface of the rotor 11R filled with the magnetic power P, hence, the torque transmission capacity of the torque limiter, is dependent on the thickness t of the spacer 17. That is, the size $G_1$ of the gap when $t=0$, namely, when the spacer 17 is not provided, is reduced to a size $G_2=G_1-t$ when the spacer 17 is interposed between the sealing member 9L and the rotor 11L, so that the torque transmission capacity of the torque limiter is enhanced. Thus, the torque transmission capacity of the torque limiter can be easily adjusted by selectively determining the thickness t of the spacer 17. The spacer 17 may also be interposed between the bottom wall 16 of the cylinder 15 and the sealing member 9L disposed near the bottom wall 16 of the cylinder 15.

It is also possible to adjust the size of the gap between the axial inner end surface of the magnetic core 10 and the radially outermost axial end surface of the rotor 11R which is to be filled with the magnetic powder P, to thereby adjust the torque transmission capacity of the torque limiter, by adjusting the depth of entrance of the end plate 14 from the open end of the cylinder 15, hence the distance of the axial inner end surface of the magnetic core 10 from the open end of the cylinder 15.

As apparent from the foregoing description, according to the present invention, the magnetic powder P is filled in the gap between the axial end surface of the rotor secured to the rotary shaft and the axial end surface of the magnetic core disposed opposite to the rotor instead of filling the magnetic powder P in the gap between the inner circumference of the cylinder and the outer circumference of the rotor or the outer circumferences of the rotors. Therefore, in filling the magnetic powder P in the gap between the axial inner end surface of the magnetic core and the radially outermost part of the axial end surface of the rotor, the magnetic powder P is attracted to the radially outermost part of the axial end surface of the rotor which is magnetized by the permanent magnet disposed contiguously to the same rotor, and is prevented from falling off the rotor, which facilitates filling the magnetic powder P in the gap.

Furthermore, since the magnetic powder P always stays in place over the axial end surface of the rotor, the torque limiter is able to function normally and stably from the beginning of operation.

Still further, according to the present invention, the torque transmission capacity of the torque limiter can be easily enhanced by providing two permanent magnets instead of one, and can be easily adjusted by providing a spacer having an appropriate thickness so as to adjust the size of the gap to be filled with the magnetic powder P properly.

Although the invention has been described in its preferred embodiments with a certain degree of particularity, it is to be understood that the present invention is not limited thereto in application, and many changes and variations are possible therein without departing from the scope thereof.

What is claimed is:

1. A torque limiter comprising:
   a cup-shaped cylinder having a radially extending bottom wall at one axial end thereof and an annular wall extending axially from said bottom wall such that said cylinder is open at the other axial end thereof, said cylinder being formed of a magnetic material;
   an axially extending rotary shaft coaxially and rotatably supported in bearings fitted in said bottom wall of said cylinder and said end plate, respectively;
   a radially extending rotor coaxially secured to said rotary shaft;
   a radially extending annular permanent magnet fixedly and coaxially fitted in said cylinder contiguously to both said bottom wall and said annular wall of said cylinder and magnetized in a direction parallel to the axis of said rotary shaft;
   a radically extending end plate coaxially and fixedly fitted in said open end of said cylinder;
   two radially extending annular cores formed of a magnetic material, one of said cores fixedly fitted in said cylinder contiguously to said permanent magnet and the other one of said cores fixedly fitted in said cylinder contiguously to an axial inner end surface of said end plate;
   magnetic powder filled in an axially extending gap between said rotor and said one of said cores disposed contiguously to said permanent magnet, said magnetic powder being magnetically held in a magnetic flux path which extends axially between said rotor and said one of said cores; and
   sealing members disposed between said bottom wall of said cylinder and said rotor and between an axial inner end surface of said end plate and said rotor, respectively, to prevent the entrance of said magnetic powder into said bearings.

2. A torque limiter comprising:
   a cup-shaped cylinder having a radially extending bottom wall at one axial end thereof and an annular wall extending axially from said bottom wall such that said cylinder is open at the other axial end thereof, said cylinder being formed of a magnetic material;
   a radially extending end plate coaxially and fixedly fitted in said open end of said cylinder;
   a radially extending rotor formed of a magnetic material and coaxially secured to said rotary shaft;
   an axially extending rotary shaft coaxially and rotatably supported in bearings fitted in said bottom wall of said cylinder and said end plate, respectively;
   a radially extending annular permanent magnet radially magnetized and coaxially fitted in said cylinder contiguously to said bottom wall of said cylinder;
   a first radially extending annular core formed of a magnetic material and fixedly fitted radially inwardly of said annular permanent magnetic contiguously to said bottom wall of said cylinder;
   a second radially extending annular core formed of a magnetic material and fixedly and coaxially fitted in said cylinder contiguously to an axial inner end surface of said end plate;
   magnetic powder filled in an axially extending gap between the rotor and said first annular core fitted radially inwardly of said annular permanent magnet, said magnetic powder being magnetically held in a magnetic flux path which extends axially between said rotor and said first core; and
   sealing members disposed between said rotor and said bottom wall of said cylinder and between said rotor and said end plate to prevent the entrance of said magnetic powder into said bearings.

3. A torque limiter comprising:
a cylinder comprising an axially extending annular wall open at both axial ends of said cylinder and formed of a magnetic material;
two radially extending end plates coaxially and fixedly fitted in said open ends of said cylinder, respectively;
an axially extending rotary shaft coaxially and rotatably supported in bearings fitted in said end plates, respectively;
a radially extending rotor formed of a magnetic material and coaxially secured to said rotary shaft;
two radially extending annular permanent magnets magnetized in the same direction parallel to the axis of said rotary shaft, one of said magnets coaxially fitted in said cylinder contiguously to an axial inner end surface of one of said end plates and the other one of said magnet is coaxially fitted in said cylinder contiguously to an axial inner end surface of the other one of said end plates;
two radially extending cores formed of a magnetic material, one of said annular cores coaxially fitted in said cylinder contiguously to an axial inner end surface of one of said permanent magnets and the other one of said annular cores coaxially fitted in said cylinder contiguously to an axial end surface of the other one of said permanent magnets;
magnetic powder filled in an axially extending gap between said rotor and one of said annular cores, said magnetic powder being magnetically held in a magnetic flux path which extends axially between said rotor and said one of said annular cores; and
two sealing members disposed between said rotor and one of said end plates and between said rotor and the other end plate, respectively, to prevent the entrance of said magnetic powder into said bearings.

4. A torque limiter according to any one of claims 1–3, wherein said end plate or end plates are formed of a magnetic material.

5. A torque limiter according to any one of claims 1–3, wherein said end plate or end plates are formed of a nonmagnetic material.

6. A torque limiter according to claim 1, wherein said one of said cores is also contiguous to said annular wall of said cylinder.

7. A torque limiter according to claim 2, wherein said second core is also contiguous to said annular wall of said cylinder and said first core is also contiguous to a radially innermost surface of said magnet.

8. The torque limiter according to claim 3, wherein each of said annular cores is contiguous to said annular wall of said cylinder and each of said magnets is contiguous to said annular wall of said cylinder.

* * * * *